(12) United States Patent
Worner

(10) Patent No.: US 10,487,561 B2
(45) Date of Patent: Nov. 26, 2019

(54) MECHANISM FOR INFLUENCING THE OPENING AND/OR CLOSING MOVEMENT OF A WING OF A DOOR OR WINDOW

(71) Applicant: GEZE GmbH, Leonberg (DE)

(72) Inventor: Benjamin Worner, Korntal-Munchingen (DE)

(73) Assignee: GEZE GmbH, Leonberg (DE)

( * ) Notice: Subject to any disclaimer, the term of this patent is extended or adjusted under 35 U.S.C. 154(b) by 38 days.

(21) Appl. No.: 15/622,301

(22) Filed: Jun. 14, 2017

(65) Prior Publication Data

US 2017/0362875 A1 Dec. 21, 2017

(30) Foreign Application Priority Data

Jun. 15, 2016 (DE) .......... 10 2016 210 606

(51) Int. Cl.
| | | |
|---|---|---|
| *E05F 15/00* | (2015.01) | |
| *E05F 15/619* | (2015.01) | |
| *H02K 7/10* | (2006.01) | |
| *H02K 7/116* | (2006.01) | |

(52) U.S. Cl.
CPC ......... *E05F 15/619* (2015.01); *H02K 7/1004* (2013.01); *H02K 7/1166* (2013.01); *E05Y 2900/132* (2013.01); *E05Y 2900/148* (2013.01)

(58) Field of Classification Search
CPC ............. E05F 15/619; E05F 2015/631; H02K 7/1166; H02K 7/1004; E05Y 2900/148; E05Y 2900/132
See application file for complete search history.

(56) References Cited

U.S. PATENT DOCUMENTS

| | | | | |
|---|---|---|---|---|
| 8,773,237 | B2 * | 7/2014 | Burris | G05B 19/0426 |
| | | | | 16/49 |
| 9,052,184 | B2 * | 6/2015 | Gutzmer | B66B 13/143 |
| 9,869,117 | B2 * | 1/2018 | Houser | E05F 15/611 |
| 2006/0244271 | A1 * | 11/2006 | Hass | E05F 15/63 |
| | | | | 292/336.3 |
| 2009/0093913 | A1 * | 4/2009 | Copeland, II | E05F 3/12 |
| | | | | 700/282 |
| 2010/0242368 | A1 * | 9/2010 | Yulkowski | E05F 15/50 |
| | | | | 49/349 |
| 2012/0245800 | A1 * | 9/2012 | Koberstaedt | B60J 5/101 |
| | | | | 701/49 |
| 2014/0346997 | A1 * | 11/2014 | Salutzki | E05F 3/224 |
| | | | | 318/628 |

(Continued)

FOREIGN PATENT DOCUMENTS

CA 2905424 A1 * 9/2014 ............ E05F 15/611

*Primary Examiner* — Jerry E Redman
(74) *Attorney, Agent, or Firm* — Steven M. Shape; Dennemeyer & Associates, LLC

(57) ABSTRACT

A mechanism for influencing opening and closing movements of a wing of a door, a window, or the like. The mechanism includes a sliding arm disposed between the wing and a fixed frame. The sliding arm is rotatably mounted to the wing or on the frame. A sliding block is disposed in a sliding rail and is coupled to the sliding arm. The sliding rail or the sliding block has means for energy conversion through which mechanical kinetic energy generated by the sliding block is converted into electrical energy to supply at least one electrical component with electric current to at least one of generate a braking torque or drive the sliding block.

18 Claims, 1 Drawing Sheet

(56) References Cited

U.S. PATENT DOCUMENTS

| | | | | |
|---|---|---|---|---|
| 2016/0311383 A1* | 10/2016 | Lange | .................... | E05B 81/90 |
| 2017/0170713 A1* | 6/2017 | Shamoto | ................ | H02K 7/025 |
| 2017/0201140 A1* | 7/2017 | Cole | ........................ | E06B 9/13 |
| 2017/0248183 A1* | 8/2017 | Strobel | ................ | F16D 63/002 |
| 2017/0362872 A1* | 12/2017 | Worner | ................ | E05F 15/603 |
| 2017/0362873 A1* | 12/2017 | Hucker | ................ | E05F 15/603 |
| 2017/0362874 A1* | 12/2017 | Worner | ................ | E05F 15/619 |
| 2017/0362875 A1* | 12/2017 | Worner | ................ | E05F 15/619 |
| 2018/0051502 A1* | 2/2018 | Roos | .................... | E05F 15/622 |
| 2018/0069454 A1* | 3/2018 | Greene | .................... | H02K 7/06 |
| 2018/0171988 A1* | 6/2018 | Fothergill | ................ | F03G 3/00 |
| 2018/0223575 A1* | 8/2018 | Hucker | .................. | E05F 1/002 |
| 2018/0223576 A1* | 8/2018 | Hucker | .................... | E05F 3/00 |
| 2018/0223577 A1* | 8/2018 | Hucker | .................... | E05F 1/10 |
| 2018/0223585 A1* | 8/2018 | Hucker | .................. | E05F 15/63 |
| 2018/0223586 A1* | 8/2018 | Hucker | .................. | E05F 15/60 |

\* cited by examiner

MECHANISM FOR INFLUENCING THE OPENING AND/OR CLOSING MOVEMENT OF A WING OF A DOOR OR WINDOW

FIELD OF THE INVENTION

The invention relates to a mechanism for influencing the opening and/or closing movement of a wing of a window or door or the like, with a sliding arm disposed between the wing and a fixed frame, said arm being rotatably mounted on pivot bearings on one side and on the other side, being guided by a sliding block in a sliding rail disposed on the frame or wing.

BACKGROUND OF THE INVENTION

The previously known mechanisms of the initially mentioned type include in particular hydraulic drives such as door closers with a working piston guided movably in a housing, acted upon in the closing direction by a spring unit, said piston interacting with a drive shaft, with which the sliding arm is coupled irrotatably in the vicinity of its end facing away form the sliding block. The drive may optionally be connected to one wing of the door or to the fixed frame. Correspondingly, the sliding arm is braced against the frame or the wing, forming a connection between the pivoting movement of the wing and the drive.

In the conventional hydraulic drives up to now, for example door closers, in which the housing is filled with a damping medium and the working piston is acted upon by a spring unit, the spring unit is compressed during a rotary movement of the drive shaft upon opening the wing, so that it can serve as an energy store for independent closure of the wing. As a rule, the interior space of the housing is divided into several chambers by the working piston. Between these chambers, in the case of the previously usual hydraulic drives or door closers, channels with assigned regulating valves are disposed for influencing the damping medium flowing back and forth between the chambers of the housing, serving to control the drive behavior.

The hydraulic components needed in the previously usual drives or door closers are relatively expensive, which results in correspondingly high manufacturing costs.

The invention is based on the task of specifying a mechanism of the initially mentioned type with which the above-mentioned problems are eliminated. With this, using the simplest possible design and correspondingly cost-advantageous manufacturing, in particular, simpler and more variable control of the opening and/or closing behavior of the mechanism is to be guaranteed.

SUMMARY OF THE INVENTION

The task is accomplished according to the disclosure herein. Preferred embodiments of the invention are also detailed in this disclosure.

The mechanism according to the invention for influencing the opening and/or closing movement of a wing of a door, a window or the like comprises a sliding arm disposed between the wing and a fixed frame, which is mounted rotatably on one hand on the wing or frame and on the other hand, is guided by a sliding block in a sliding channel disposed on the frame or wing. According to the invention, energy conversion means are assigned to the sliding rail and/or the sliding block, through which mechanical energy of the sliding block can be converted to electrical energy, and electrical energy produced in this way can be converted to mechanical energy, in order to supply at least one electrical component with electric current, to generate a braking torque and/or to drive the sliding rail, at least in sections, especially to support the closing and/or opening movement.

Based on this configuration, with a simpler structure and the possibility for correspondingly more cost-advantageous fabrication, simpler and more versatile control of the opening and/or closing behavior of the mechanism is guaranteed. The hydraulic components previously required especially for damping the closing movement of the wing can be dispensed with. Now it is also possible, for example, to influence or control the closing time characteristics electrically. The electrical energy generated by the energy conversion means during the opening and/or closing of the wing can especially be used to supply at least one electrical component with electric current, to generate a braking torque and/or to drive the sliding block at least in sections to support the closing and/opening movement. In the latter case the electric energy, stored temporarily if desired, may be used for example to strengthen the closing force.

Preferably the energy conversion means comprise an electrical generator/motor unit that can be operated as both a generator and a motor, as well as a gear drive, integrated in the sliding rails and/or in the sliding rail, over which the sliding block is coupled with the electrical generator/motor unit.

In the generator drive, for example, a rotor of the electrical generator/motor unit can be mechanically driven via the sliding block, so that electrical energy is stored in the coils of the stator of the electrical generator/motor unit. In this process, during generator operation, at least one electrical component can be directly supplied with power. To supply a respective electrical component with power, electrical energy previously generated by the generator/motor unit and stored temporarily may also be used. If, for example, current is conducted over a bypass to the generator/motor unit, this creates a braking torque that is transmitted over the sliding block, so that the wing is electrically damped. Temporarily stored electrical energy can also be used to drive the motor and to support the opening movement when opening the wing. With a corresponding increase in the closing force, for example, it is possible to ensure that the wing is reliably closed.

According to a further preferred alternative embodiment of the mechanism according to the invention, the gear drive comprises a traction element mounted movably in the sliding rail. In this case such a traction element can comprise especially a traction element circulating in the sliding rail.

Advantageously the circulating traction element is guided around deflection elements provided in the area of the two opposite ends of the sliding rail.

In particular, the sliding block can be coupled to a strand of the circulating traction element.

It is especially advantageous if the electrical generator/motor unit is coupled to a deflection element supported rotatably in the sliding rail and encircled by the circulating traction element. In this case the electrical generator/motor unit, for example, can be coupled with the rotatable deflection element over a worm drive.

In particular, the worm drive can comprise a gear wheel or worm gear disposed on the rotatable deflection element and a helical screw provided on an output shaft and/or a drive shaft of the electrical generator/motor unit, with which the gear wheel or worm gear engages.

The traction element advantageously comprises a toothed belt, a chain, a cable or the like.

For temporarily storing the electrical energy generated by the energy conversion means, an energy storage unit of any desired type and/or a rechargeable electrical energy storage unit, for example a capacitor, a battery pack and/or the like may be provided. As was previously mentioned, the temporarily stored electrical energy can be used, for example, to drive the motor and to support the opening or closing movement of the wing during its opening or closing. Alternatively or additionally, the temporarily stored electrical energy can also serve for supplying any desired electrical components with electric current.

It is also especially advantageous if the electrical generator/motor unit comprises a gear drive motor/generator. Correspondingly, the generator/motor unit can comprise a combination of a generator/motor unit that can also be operated as a motor and a gear drive.

According to an advantageous practical embodiment of the mechanism according to the invention, the gear drive is designed such that in at least one direction of movement of the wing, free-wheeling occurs in a section between the sliding block and the energy conversion means.

According to an additional preferred practical embodiment of the mechanism according to the invention, this comprises an electronic control unit, over which the electrical generator/motor unit and/or at least one other component can be actuated.

Advantageously the electrical generator/motor unit can be actuated over the electronic control unit to influence the closing and/or opening movement of the wing.

In the area of its end away from the sliding block, the sliding arm is preferably connected irrotatably with a drive shaft of a drive. The drive can especially comprise a piston interacting with the drive shaft and acted upon by a spring unit in the closing direction.

Advantageously the gear drive is designed in such a manner, and/or the electric motor/generator unit can be actuated in such a manner, that in at least one movement direction of the wing, freewheeling takes place in sections between the sliding block and the energy conversion means.

Through corresponding actuation of the electrical generator/motor unit via the electronic control unit, the drive behavior, especially the closing time characteristics, strengthening of the closing force or the like, can be controlled in the desired manner.

For example, the electronic control unit can comprise at least one microcontroller. A microcontroller of this type can be easily programmed in a variable manner and thus optimally adapted to the respective circumstances and/or the respective desired behavior of the opening and/or closing movement of the wing.

For example, the electronic control unit can be connected to at least one rotary pulse generator, at least one scanner, at least one switch, at least one sensor and/or the like. Here, the respective connection may be wired and/or wireless.

It is especially advantageous if the electronic control unit comprises at least one communication interface for wired and/or wireless communication.

Through the energy conversion means, as the respective electrical component, power can be supplied to at least one electrical valve connected to the drive, at least one sensor, at least one signal generator, at least one lighting element, an electrical drive unit connected to the drive and/or the like. Alternatively or additionally, the energy conversion means can be used for supplying electric current to any desired other or additional electrical components.

BRIEF DESCRIPTION OF THE SEVERAL VIEWS OF THE DRAWINGS

In the following, based on an exemplified embodiment, the invention will be explained in further detail with reference to the drawing; this shows the following.

DETAILED DESCRIPTION

Figure 1:
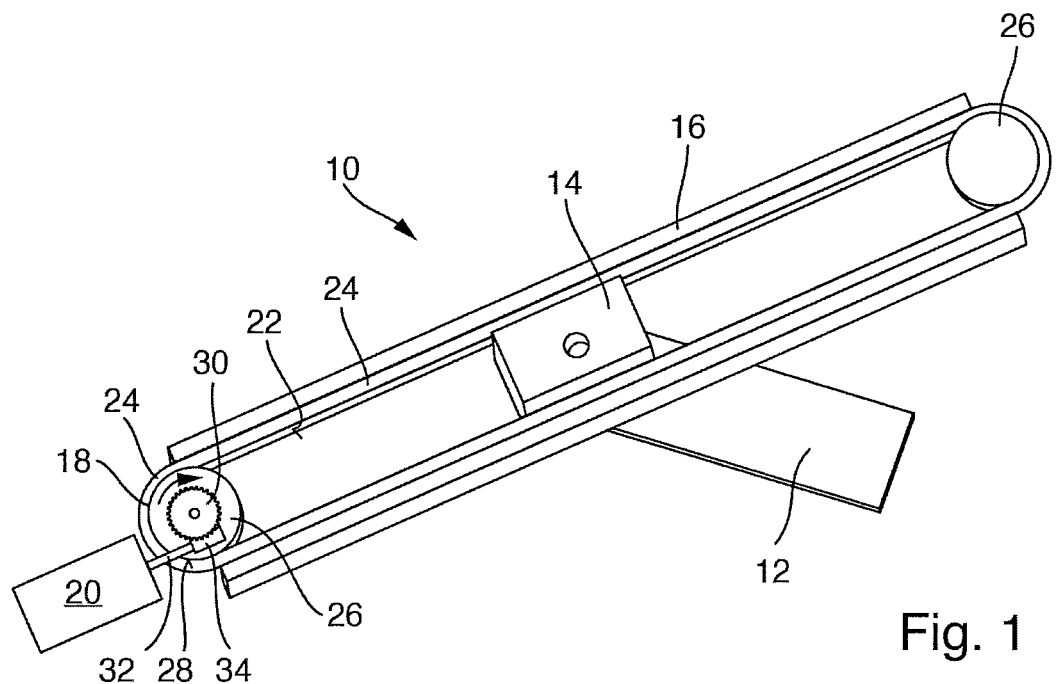
FIG. 1 a schematic representation of an exemplified embodiment of a mechanism according to the invention for influencing the opening and/or closing movement of a wing of a door, a window or the like, and FIG. 2 a schematic representation of an exemplified embodiment of the electronic control unit of the mechanism according to FIG. 1 with a microcontroller and exemplified components connected with it.
Figure 2:
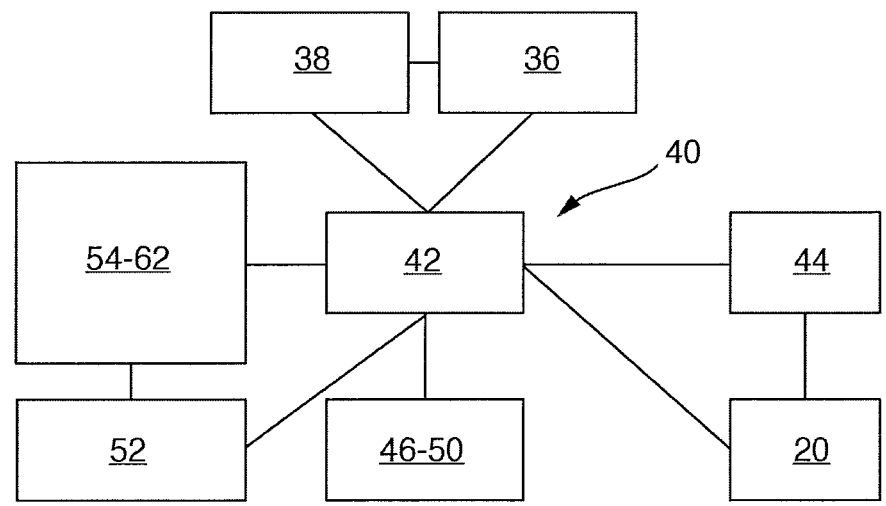

FIGS. 1 to 2 show schematic representations of an exemplified embodiment of a mechanism 10 according to the invention for influencing the opening and/or closing movement of a wing of a door, a window or the like.

The mechanism 10 comprises a sliding arm 12 disposed between the wing and a fixed frame, which is rotatably supported on one hand on the wing or on the frame and on the other hand is guided by a sliding block 14 in a sliding rail 16 disposed on the frame or wing. With this, means 18 are assigned to the sliding rail 16 and/or the sliding block 14, through which mechanical kinetic energy of the sliding block 14 can be converted into electrical energy and electrical energy generated in this way into mechanical energy, in order especially to supply at least one electrical component with electric current, to generate a braking torque and/or to drive the sliding block 14 at least in sections, especially to support the closing and/or opening movement.

The means 18 for energy conversion can especially comprise an electrical generator/motor unit 20 operable as both a generator and a motor as well as a gear drive 22 integrated in the sliding rail 16 and/or in the sliding block 14, over which the sliding block 14 is coupled with the electrical generator/motor unit 20.

FIG. 1 shows in schematic representation an exemplified embodiment of a mechanism 10 according to the invention, in which the gear drive 22 comprises a traction element 24 movably supported in the sliding rail 16. In the present case this involves, for example, a traction element 24 circulating in the sliding rail 16.

As is apparent from FIG. 1, the circulating traction element 24 is guided around deflection elements 26 provided in the area of the two opposite ends of the sliding rail 16. In particular, the sliding block 14 can be coupled to a strand of the circulating traction element 24.

As shown, the electrical generator/motor unit 24 can for example be coupled to a deflection element 42 supported rotatably in the sliding rail 16 and encircled by the circulating traction element 26.

With this the electrical generator/motor unit 20 can be coupled for example over a worm drive 28 with the rotatable deflection element 26, which in the present case comprises for example a helical screw 34 a gear wheel or worm gear 30 assigned to the rotatable deflection element 26 and an output shaft and/or a drive shaft 32 of the electrical generator/motor unit 20, with which the gear wheel or worm gear 38 engages.

The traction element 24 can especially comprise a toothed belt, a chain, a cable or the like.

For temporarily storing the electrical energy generated by the energy conversion means 18, an energy storage unit 36 of any desired type and/or a rechargeable electrical energy storage unit 38, for example a capacitor, a battery pack and/or the like may be provided (see FIG. 2).

The temporarily stored electrical energy can be used, for example, to drive the generator/motor unit 20 as a motor and to support the opening or closing movement of the wing during its opening or closing. Alternatively or additionally, the temporarily stored electrical energy can also serve for supplying any desired electrical components with electric current.

The electrical generator/motor unit 20 can for example comprise a gear drive motor/generator. A generator/motor unit of this type comprises a combination of a generator/motor unit that can be operated as both a generator and a motor and a gear drive.

In addition, a given mechanism 10 can also comprise an electronic control unit 40, over which the electrical generator/motor unit 20 and/or at least one other component can be actuated.

In this case the electrical generator/motor unit 20 can be actuated over the electronic control unit 40 to influence the closing and/or opening movement of the wing.

In the area of its end opposite the sliding block 14, the sliding arm 12 is preferably connected irrotatably with a drive shaft of a drive. For example, a drive of this type can comprise a piston interacting with the drive shaft and acted upon by a spring unit in the closing direction.

The gear drive 22 can be designed in such a manner, and/or the electric motor/generator unit 20 can be actuated by the electronic control unit 40 in such a manner that in at least one movement direction of the wing, freewheeling takes place in sections between the sliding block 14 and the energy conversion means 18.

Through corresponding actuation of the electric generator/motor unit 20 via the electronic control unit 40, the drive behavior, especially the closing time characteristics, strengthening of the closing force or the like, can be controlled in the desired manner.

For example, the electronic control unit 40 can comprise at least one microcontroller 42. For example, it can be connected to at least one rotary pulse generator 44, at least one scanner 46, at least one switch 48, at least one sensor 50 and/or the like. (FIG. 2). Here, the respective connection may be wired and/or wireless.

Alternatively or additionally, the electronic control unit 40 comprises at least one communication interface 52 for wired and/or wireless communication (again see FIG. 2). In this process, for example, the electronic control unit 40 can be connected with at least one scanner provided on a controller or the like, and/or communicate with at least one peripheral unit over a NFC or near-field communication connection and/or a Bluetooth connection and/or the like.

Through the energy conversion means 18, as the respective electrical components, for example power can be supplied to at least one electronic control unit 40, at least one electrical valve 54 connected to the drive, at least one sensor 56, at least one signal generator 58, at least one optical generator and/or at least one acoustic signal generator, at lease one lighting element 60, an electrical drive unit 62 assigned to the drive and/or the like (again see FIG. 2).

The design according to the invention enables, using a relatively simple assembly and correspondingly cost-advantageous manufacturing, in particular, easy and versatile control of the opening and/or closing behavior of the mechanism 10. Through the energy conversion means 18 integrated in or assigned to the sliding rail 16, it is possible both to generate energy for powering components and to dissipate energy from the drive or door closer to accomplish electrical damping. The hydraulic components previously required for damping the drive or door closer can be dispensed with. It is now possible, among other things, to control closing time sequences electrically and/or to utilize the energy conversion means 18 as a drive for increasing or strengthening the closing force.

The respective implementation and execution of the gear drive 22 can be adapted to the respectively existing force relationships. In the gear drive 22, for example, freewheeling is also possible, especially in one direction. The sliding block 14 is slid during opening and/or closing of the wing. During sliding of the sliding block 14, the rotary movement is transferred over the said gear drive 22 to the electrical generator/motor unit 20, which can also be operated as a motor, over this energy conversion unit 18. If the power is transferred over a bypass back into the generator/motor unit 20 operated as a motor, the motor produces a braking torque that is transferred over the gear drive 22, the sliding block 14 and the sliding arm 12 to the piston of the drive, so that the d drive or door closer, for example, can be electrically damped.

The electrical energy generated by the energy conversion means 18 can also be temporarily stored. Therefore among other things, the temporarily stored electrical energy can also be used to drive the motor and to support the opening and/or closing movement of the wing. For reliable closing of the wing, the closing force can be increased appropriately via the motor.

With the electrical energy generated via the energy conversion means 18, for example, the electronic control unit 40 or the microcontroller of this unit itself can supply electric components 54 to 62 or consumers such as electrical valves, signal generators, illumination elements and/or the like with power. Pulse generators, scanners and/or the like can supply the electronic control unit 40 or its microcontroller 42 for example with information on the status of the drive or door closer. If the energy conversion means 18 are used for damping, opening, closing, and/or the like of the wing, the electronic control unit 40 or the microcontroller thereof 42 can adjust the motor power appropriately for the needs. Over at least one interface, the electronic control unit 40 or the microcontroller thereof 42 can exchange and/or obtain information and/or instructions with and/or from assigned components.

LIST OF SYMBOLS

10 Mechanism
12 Sliding arm
14 Sliding block
16 Sliding rail
18 Energy conversion means
20 Generator/motor unit
22 Gear drive
24 Traction element
26 Deflection element
28 Worm drive
30 Gear wheel or worm gear
32 Power take-off and/or drive shaft
34 Worm
36 Energy storage unit
38 Rechargeable energy storage unit
40 Electronic control unit
42 Microcontroller
44 Rotary pulse generator
46 Scanner 48 Switch
50 Sensor
52 Communication interface
54 Electric valve
56 Sensor
58 Signal generator
60 Illumination element
62 Electric drive unit

The invention claimed is:

1. A mechanism (10) for influencing opening and closing movements of a wing of a door, a window, or the like comprising:
   a sliding arm (12) disposed between the wing and a fixed frame, the sliding arm (12) being rotatably mounted to the wing or on the frame;
   a sliding block (14) disposed in a sliding rail (16) and coupled to the sliding arm (12), wherein the sliding rail (16) or the sliding block (14) has means (18) for energy conversion through which mechanical kinetic energy generated by the sliding block (14) is converted into electrical energy in order to supply at least one electrical component (40, 42, 54-62) with electric current to at least one of generate a braking torque or drive the sliding block (14).

2. The mechanism according to claim 1, further comprising:
   an electrical generator or motor unit (20) operable as both a generator and a motor; and
   a gear drive (22) integrated in one of the sliding rail (16) or the sliding block (14), the gear drive (22) coupling the sliding block (14) with the electrical generator or motor unit (20) to convert energy.

3. The mechanism according to claim 2, wherein the gear drive (22) comprises a traction element (24) movably supported in the sliding rail (16).

4. The mechanism according to claim 3, wherein the traction element (24) is movably positioned in the sliding rail (16).

5. The mechanism according to claim 4, further comprising a first deflection element (26) at a first end of the sliding rail (16) and a second deflection element (26) at a second end of the sliding rail (16) opposite the first end, wherein the traction element (24) is guided around the first deflection element and the second deflection element provided in an area between the first end and the second end of the sliding rail (16).

6. The mechanism according to claim 4, wherein the sliding block (14) is coupled to the traction element (24).

7. The mechanism according to claim 3, wherein the electrical generator or motor unit (20) is coupled to a rotatable deflection element (26) supported rotatably in the sliding rail (16) and encircled by the traction element (24).

8. The mechanism according to claim 7, further comprising a worm drive (28), wherein the electrical generator or motor unit (20) is coupled to the rotatable deflection element (26) by the worm drive (28).

9. The mechanism according to claim 8, wherein the worm drive (28) comprises a gear wheel or a worm gear (30) disposed on the rotatable deflection element (26) and a helical screw (34) provided on one of an output shaft or a drive shaft (32) of the electrical generator or motor unit (20), the helical screw (34) engaged with the gear wheel or the worm gear (30).

10. The mechanism according to claim 3, wherein the traction element (24) comprises one of a toothed belt, a chain, or a cable.

11. The mechanism according to claim 2, wherein the electrical generator or motor unit (20) comprises a gear drive generator or motor.

12. The mechanism according to claim 2, further comprising an electronic control unit (40) configured to actuate at least one of the electrical generator or motor unit (20) or at least one other component.

13. The mechanism according to claim 12, wherein the electrical generator or motor unit (20) is actuated by the electronic control unit (40) to influence the closing and opening movements of the wing.

14. The mechanism according to claim 2, further comprising an electronic control unit (40), wherein the gear drive (22) or the electric motor or generator unit (20) is actuated by the electronic control unit (40) so that for at least one movement direction of the wing, freewheeling takes place in a section between the sliding block (14) and the means (18) for energy conversion.

15. The mechanism according to claim 2, further comprising an electronic control unit (40), wherein through corresponding actuation of the electric generator or motor unit (20) via the electronic control unit (40), drive closing times and a strengthening of a closing force can be controlled.

16. The mechanism according to claim 1, further comprising an energy storage unit (36) or a rechargeable electrical energy storage unit (38) for temporarily storing the electrical energy.

17. The mechanism according to claim 1, further comprising a drive shaft, wherein the sliding arm (12) has an end, which is away from the sliding block (14), and wherein the sliding arm (12) is connected with the drive shaft.

18. The mechanism according to claim 17, further comprising a piston and a spring unit, the piston interacting with the drive shaft and acted upon in a closing direction by the spring unit.

* * * * *